United States Patent Office 2,736,190
Patented Feb. 28, 1956

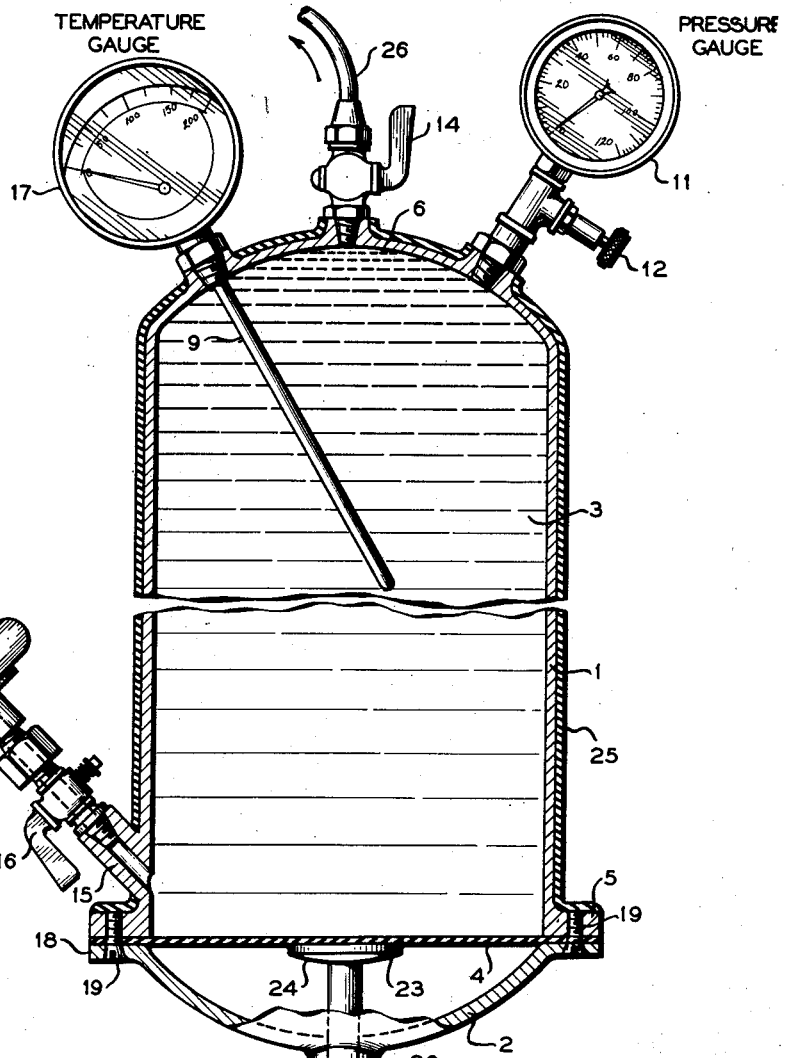
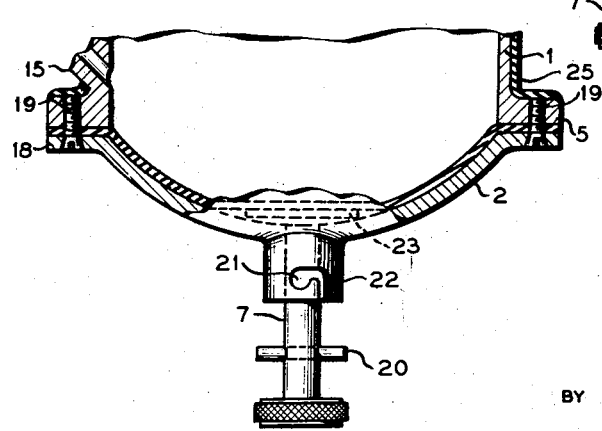

2,736,190

TESTING DEVICE FOR DETERMINING VOLUME OF GAS IN LIQUID

John B. Bockelmann, Tenafly, N. J., and Charles Hanft, Hicksville, N. Y., assignors to The F. & M. Schaefer Brewing Co., Brooklyn, N. Y.

Application October 22, 1954, Serial No. 463,967

9 Claims. (Cl. 73—19)

This invention relates to a durable and portable device for determining the vapor pressure of a gas in saturated liquids and more particularly for determining the percentage of $CO_2$ in beer.

An object of the invention is to provide a simply operated device for testing a saturated liquid such as beer and providing suitable pressure and temperature indications that will indicate the vapor pressure of the dissolved gas in the tested liquid.

A further object of the invention is to provide a portable durable device fabricated of corrosion-resistant metal which can be easily sterilized and cleaned and which will withstand rough handling while still maintaining a high degree of accuracy.

A further object of the invention is to provide a device which will eliminate as far as possible personal factors which affect the accuracy of the tests.

A still further object of the invention is to eliminate the necessity of venting to provide a predetermined visually indicated ratio between the liquid and gas components of the sample being tested and to provide a fixed auxiliary volume or space bearing a definite ratio to the volume of the sample being tested which can be easily, quickly and with accuracy introduced in repeated consecutive tests.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In connection with that more detailed description, there is shown in the drawings, in Figure 1 a cross sectional view in elevation of an embodiment of the invention, Figure 2 a detail of Figure 1.

Heretofore there has been used a $CO_2$ tester constructed in accordance with U. S. Patent No. 2,102,105, granted December 14, 1937, comprising an upright metal cylinder fitted with an internal glass thermometer, a Bourdon pressure gauge, a sight glass above the cylinder, a bleeding valve attached to the neck of the pressure gauge and an intake valve at the bottom of the cylinder. The use of this instrument over a period of years in a brewery discloses the following serious deficiencies:

1. The glass-fitted instrument is quite fragile and when used by unskilled personnel, it is frequently dropped breaking the sight glass and the internal thermometer which is fitted with a transparent glass casing for temperature readings.

2. As recognized by the manufacturer of the instrument, it is necessary to bleed part of the sample to bring the level of the sample to a standardized marking on the sight glass. This vents the sample to the atmosphere and thereby introduces errors in the ultimate reading obtained.

Although the instrument is standardized against solutions whose gas content is determined by more precise means, an appreciable error is nevertheless introduced. This error due to venting is exaggerated when the instrument is improperly handled or proper sampling precautions are not observed and the sample is permitted to warm up to a higher temperature than existed in the vat from which the sample was taken. Reproducibility of the test result is the standard desired and the observation of divergent readings involves delay until check readings are obtained.

The instrument of the present invention obviates these difficulties. The greatly simplified cylinder-diaphragm tester provides better volume control. The present invention operates according to an entirely different principle than the bleeding type of tester and, remarkably, provides even greater accuracy than is possible with the glass-fitted device used heretofore. Along with the improvement in accuracy there is obtained at the same time a more rugged construction which withstands the severe mechanical abuse which may be encountered.

As shown in Figure 1, the testing device of the invention comprises a copper cylinder 1 fitted with a dished or cup shaped flanged head 2 made of the same material. The chamber 3 for the gas-liquid solution being tested is formed by the flexible, inert, impervious, diaphragm 4 held between flange 5 upon cylinder 1 and flange 18 upon head 2 connecting head 2 to cylinder 1 and the closed end 6 of the cylinder 1 opposite the diaphragm 4. Flange bolts 19 are inserted through openings 20 in the diaphragm 4 thereby securing the diaphragm firmly between the flanges 5 and 18 and the volume of the chamber 3 is adjustable by virtue of the hand manipulation of push rod 7. Push rod 7 in the closed position fixed by the engagement of pin 20 thereon in the bayonet slot 21 of collar 22 upon the head 2 maintains the diaphragm in the neutral, undistended position. It is in this position that the sample is introduced through the valve assembly 8, which valve assembly is of the conventional type. By releasing the pin 20 of the push rod from the position wherein it is locked in the bayonet slot 21 of the collar 22, the diaphragm 4 may be distended to increase the volume of the chamber 3 by the additional fixed amount defined by the bottom dished end, which is substantially the volume of dished head 2.

A bi-metallic dial thermometer 9 and a Bourdon pressure gauge 11 are mounted on the end head 6. A bleed petcock 12 is also mounted on the neck of the pressure gauge 11. A tubular interiorly threaded boss 15 is incorporated on the side of the cylinder just above the flange into which an inlet petcock 16 is screwed to permit entry of the liquid to be tested.

The operation of the device consists of purging the cylinder 3 with the liquid to be tested until temperature is stabilized as read on temperature gauge scale 17. The diaphragm is held in its neutral or locked position during this operation and liquid is admitted at the opening 10 on the side of the cylinder and exhausted through the outlet petcock 14 on the gauge head end through flexible tube 26. The exhaust petcock 14 is closed first then the inlet petcock 16 is closed and the cylinder shaken. The diaphragm 4 is then released by removing the pin 20 from slot 21 as shown in Fig. 2 and permitted to distend fully. Temperature and pressure are then noted on the gauges 17 and 11 respectively. The corresponding values can be selected in a pressure and temperature vs. gas volume table that is suitable for the liquid and vapors under test and a reading of the per cent gas is thereby obtained. It is not necessary to build up any counterpressure within the chamber 3.

The advantages of this device over other prevailing devices are first, the simplicity and accuracy in repeatedly establishing an auxiliary space of fixed volume having a fixed ratio to the volume of chamber 3 when filled with the liquid to be tested without the necessity of venting to the atmosphere as is customary at present and second, the general ruggedness and lightness of the complete device and its ease of handling.

Variations in methods and materials can be made to make the device suitable for the conditions of the liquid, handling, pressures and temperatures to be encountered. Volume of the auxiliary space to the total volume may also be varied with the aforementioned changes. For beer, a one to thirty-six ratio between the auxiliary space or volume and the chamber 3 when the diaphragm is in neutral position is quite satisfactory.

The diaphragm 4 is preferably made of rubber or synthetic rubber which is inert, physically and chemically with respect to the liquid sample drawn into the device. Gum rubber is particularly suitable. The diaphragm is of sufficient thickness and is suitably dimensioned with respect to its thickness and its upper planar surface to provide a constant volume at its locked position in the device which is reproducible during constant usage of the device. By observing the proper precautions in the filling of the device and by properly manipulating the push rod plate 23, the auxiliary volume which is substantially the same as the volume of dished head 2 is precisely the same volume for each test which is made, and the error introduced by venting as now practised is completely eliminated.

The push rod plate 23 which is in contact with the diaphragm 4 is laterally extended or when circular of large enough diameter so as to be sufficient to provide a proper support for the diaphragm and to effectively standardize the volumes in the locked and distended positions respectively of the diaphragm. The underside of the push rod plate 23 is preferably curved as at 24 to conform with the corresponding inner curved surface of the head 2, thereby assuring uniformity of the distended volume after repeated operations and despite normal or abnormal usage of the tester.

To facilitate cleaning and sterilization, the entire cylinder, head and fittings may be fabricated of copper or stainless steel or the like. To protect the corrosion resistant metal employed and to facilitate the provision of fluid-tight joints which are constructed to prevent the accumulation of dirt or debris at the connections, a covering 25 of rubber or synthetic rubber or thermoplastic resin is provided for the cylinder and about the connecting nipples from the gauges and petcocks. The cover is of sufficient thickness to absorb the shock which the instrument is subjected to when dropped on a concrete or tile floor or when dropped to the bottom of a vat half full or empty. The head 2 may likewise be covered with rubber if desired but it is preferred that the flange 5 be sufficiently exposed to permit ready assembly and disassembly of the head 2 and cylinder 3.

It has been possible to achieve an accuracy of about 3% in testing the $CO_2$ gas content in beer which is an accuracy superior to that which can be achieved with instruments heretofore used. The manipulation of the tester is far easier and the instrument can be entrusted to unskilled personnel because of the elimination of the personal factor and without fear of damage or breakage. The geometry of the instrument is such in comparison with the Zahm instrument that larger samples can be used in an instrument of the same outer dimensions thereby permitting greater accuracy. The instrument may vary in size depending upon the particular concentration range of the gas under pressure but it need not be any larger in outer dimensions than the instruments heretofore used to accomplish the same purpose but with greater accuracy.

The table or empirical charts mentioned in U. S. Patent No. 2,102,105 may be used.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

Having thus disclosed the invention what is claimed is:

1. A device for determining the gas content of a liquid containing the gas in solution comprising a container, a pressure gauge and a temperature gauge mounted on said container, a flexible impervious diaphragm mounted on said container forming a main chamber and an auxiliary chamber having a predetermined volume ratio, said pressure gauge and temperature gauge having communication with the interior of said main chamber, an inlet to said main chamber for filling said main chamber with the liquid to be tested, an outlet to said main chamber for removing the liquid from said chamber during the preliminary purging of said main chamber, means for maintaining said diaphragm in fixed position during the filling of said main chamber with the liquid to be tested and means for releasing said diaphragm after the filling of said main chamber to augment the volume of said main chamber by substantially the volume of said auxiliary chamber.

2. A device for determining the gas content of a liquid containing the gas in solution comprising a container, a pressure gauge and a temperature gauge mounted on said container, a flexible impervious diaphragm mounted on said container forming a main chamber and an auxiliary chamber having a predetermined volume ratio, said pressure gauge and temperature gauge having communication with the interior of said main chamber, an inlet to said main chamber for filling said main chamber with the liquid to be tested, an outlet to said main chamber for removing the liquid from said chamber during the preliminary purging of said main chamber, a plate supporting said diaphragm in fixed position during the filling of said main chamber with the liquid to be tested and means extending exteriorly of said cylinder for releasing said plate to thereby release said diaphragm after the filling of said main chamber to augment the volume of said main chamber a fixed predetermined amount.

3. A device for determining the gas content of a liquid containing the gas in solution comprising, a shock-resistant, rigid cylinder having a closed end fitted with a Bourdon pressure gauge and a bi-metallic temperature gauge, said cylinder having an open end fitted with a flexible impervious diaphragm, an inlet to said cylinder above said diaphragm for filling the chamber defined by said cylinder and diaphragm with the liquid being tested, an outlet at the top of said cylinder for removing the liquid from said chamber, a flanged dished shock-resistant, rigid head attached to said open end of said cylinder covered by said diaphragm in fluid-tight relation thereto and which encloses a constant volume between the flat position of said diaphragm and the dished interior of said head and a retractable push rod centrally located in said head to support the underside of said diaphragm at its uppermost position in the flat condition and retractable to permit the diaphragm to conform to the dished interior surface of said head at its lowermost position to provide a constant volume of liquid and a constant volume of space above said liquid upon filling said chamber with the liquid being treated to thereby provide reproducibility of the pressure readings at a particular temperature to indicate the per cent gas in said liquid.

4. A device as in claim 3 wherein said cylinder is of copper, said diaphragm is formed of gum rubber and said push rod is fitted with a projection which locks to maintain the diaphragm in its upper flat position.

5. A device as in claim 3 wherein said cylinder is formed of stainless steel.

6. A device as claimed in claim 4 wherein a sleeve is centrally located on said head, locking means is provided in said sleeve to lock said push rod projection when the push rod is in its upper extended position, said push rod projection being disengageable from said locking means to permit said push rod to be guided in said sleeve to distend said diaphragm by the withdrawal of the push rod to its lowermost position.

7. A device as in claim 6 wherein said copper cylinder is covered with a shock-absorbing flexible rubber covering, which covering extends over the temperature and pressure gauge connections to enclose the connections of said pressure and temperature gauges to said cylinder and to prevent the collection of dirt and debris at these connections.

8. A device for determining the gas content of a liquid containing a gas in solution comprising a container, a pressure gauge and a temperature gauge mounted on said container, collapsible impervious means mounted on said container forming a main chamber and an auxiliary chamber having a predetermined volume ratio, said pressure gauge and temperature gauge having communication with the interior of said main chamber, an inlet to said main chamber for filling said main chamber with the liquid to be tested, an outlet to said main chamber for removing the liquid from said main chamber during the preliminary purging of said main chamber, means for maintaining said collapsible means in fixed position during the filling of said main chamber with the liquid to be tested and means for releasing said collapsible means after the filling of said main chamber to augment the volume of said main chamber by substantially the volume of said auxiliary chamber.

9. A device for determining the gas content of a liquid containing a gas in solution comprising an expansible sealed container including a wall portion movable between predetermined limits, an inlet to said container for the introduction of a test fluid thereinto, a pressure guage communicating with the interior of said container and a thermometer having its sensing portion exposed within said container.

References Cited in the file of this patent

UNITED STATES PATENTS

| | | |
|---|---|---|
| 2,102,105 | Zahm | Dec. 14, 1937 |
| 2,138,141 | Cromer et al. | Nov. 29, 1938 |
| 2,662,393 | Rzasa | Dec. 15, 1953 |
| 2,668,437 | Patch | Feb. 9, 1954 |